Figure 21:
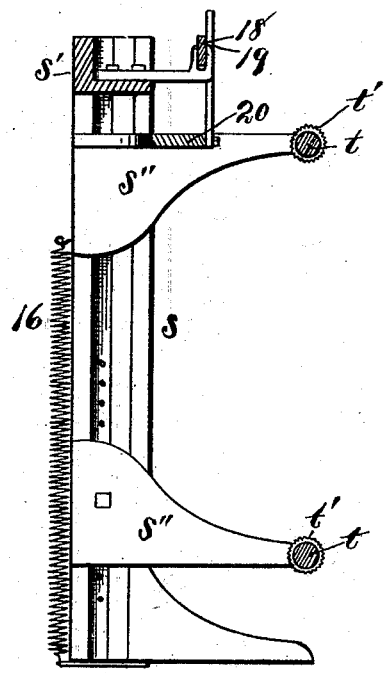

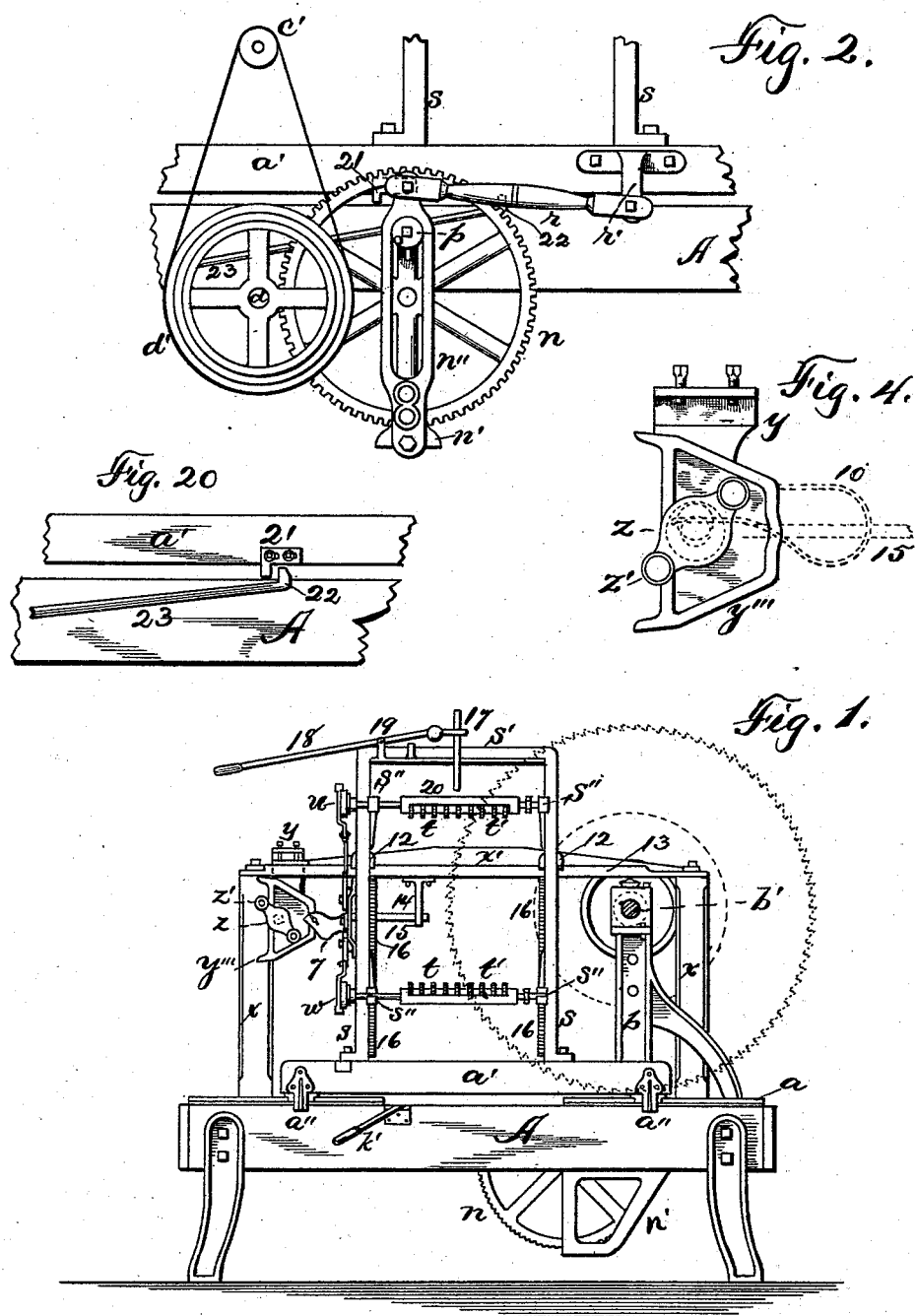

(No Model.) 4 Sheets—Sheet 2.
A. B. IRELAND.
MACHINE FOR CUTTING SHINGLES AND HEADINGS.
No. 525,049. Patented Aug. 28, 1894.
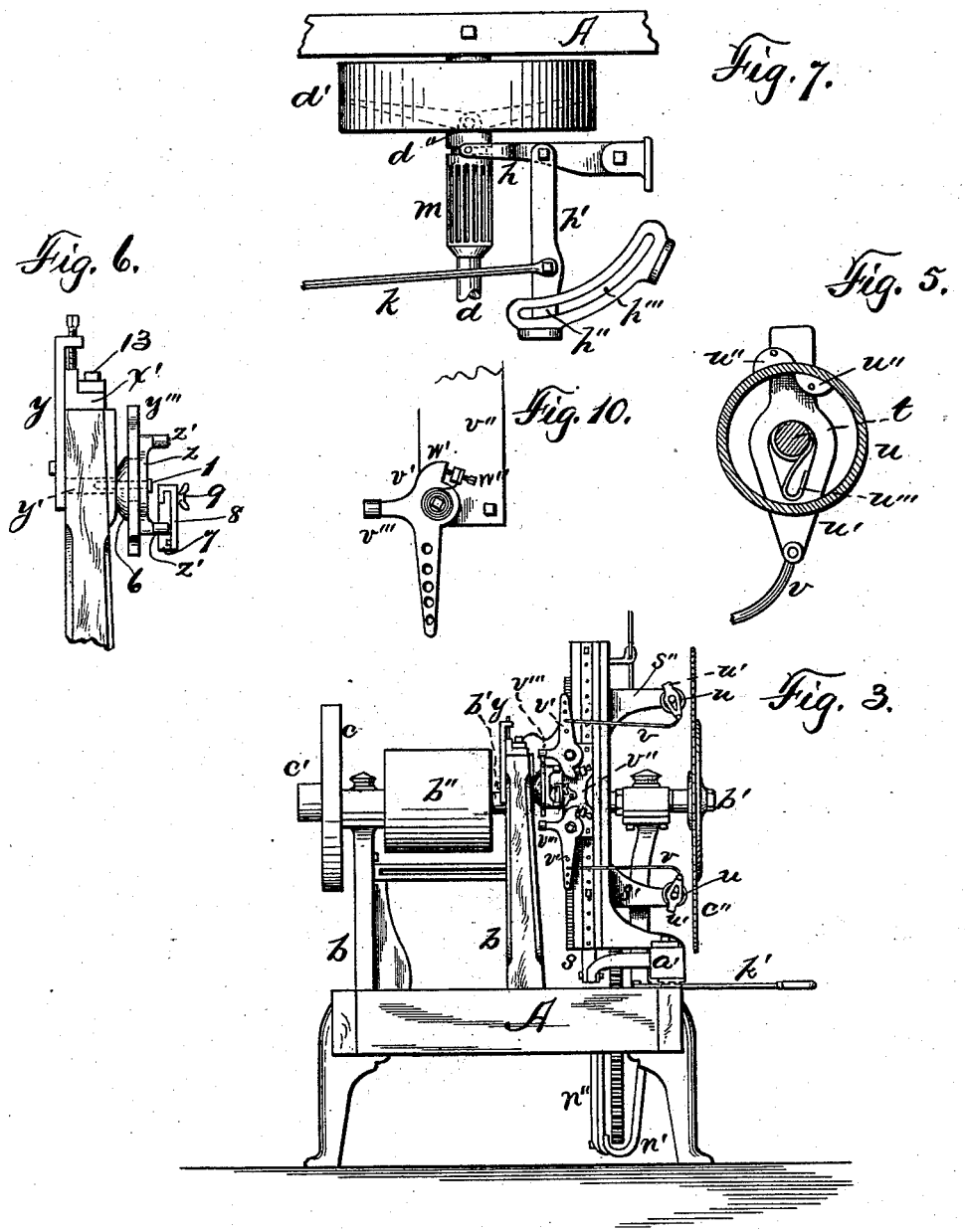
WITNESSES:
INVENTOR
A. Bertsell Ireland
By Smith & Donnison
ATTORNEYS.

(No Model.) 4 Sheets—Sheet 3.
A. B. IRELAND.
MACHINE FOR CUTTING SHINGLES AND HEADINGS.
No. 525,049. Patented Aug. 28, 1894.
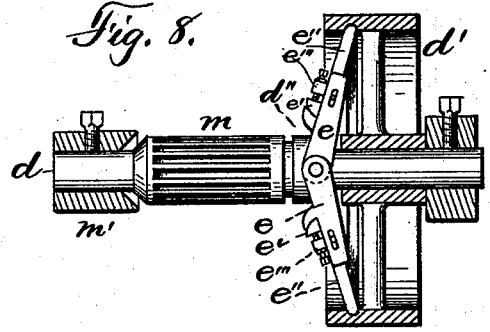
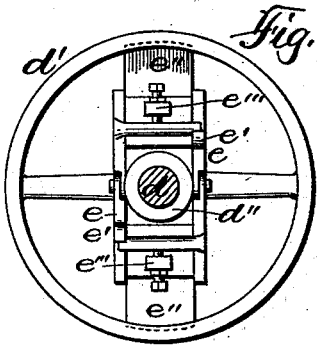
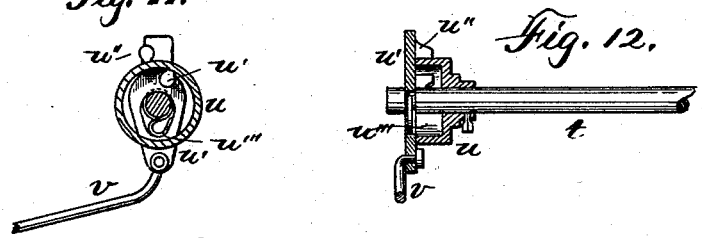
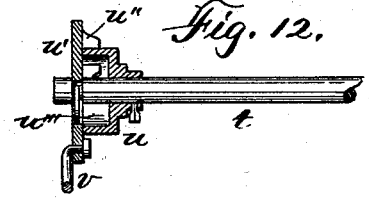
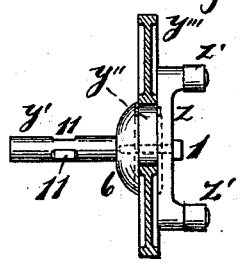
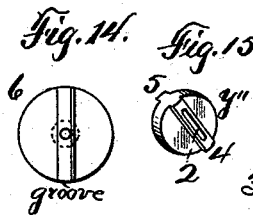
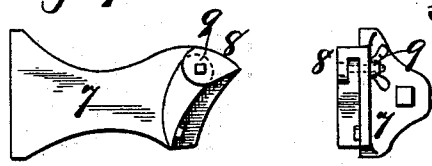
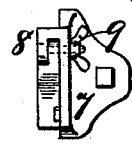
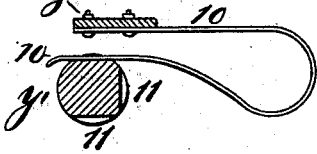
WITNESSES:
H. A. Carhart
C. B. Kinne
INVENTOR
A Bertsell Ireland
By Smith & Denison
ATTORNEYS.

(No Model.) 4 Sheets—Sheet 4.
A. B. IRELAND.
MACHINE FOR CUTTING SHINGLES AND HEADINGS.
No. 525,049. Patented Aug. 28, 1894.

WITNESSES:
INVENTOR
BY
ATTORNEYS.

UNITED STATES PATENT OFFICE.

A BERTSELL IRELAND, OF GREENE, NEW YORK.

MACHINE FOR CUTTING SHINGLES AND HEADINGS.

SPECIFICATION forming part of Letters Patent No. 525,049, dated August 28, 1894.

Application filed February 9, 1893. Renewed July 27, 1894. Serial No. 518,713. (No model.)

*To all whom it may concern:*

Be it known that I, A BERTSELL IRELAND, of Greene, in the county of Chenango, in the State of New York, have invented new and useful Improvements in Machines for Cutting Shingles and Headings, of which the following, taken in connection with the accompanying drawings, is a full, clear, and exact description.

My invention relates to shingle cutting machines, and to that class in which a bolt is mounted upon a traversing table, and is fed laterally thereon, either to cut the taper alternately from either end, or can be fed so as to cut, without any taper, of equal thickness at both ends; such feed being automatic and intermittent until the whole bolt is cut up.

My object is to construct a machine provided with a traversing table and means to impart a slow forward movement thereto and a rapid return; means being also provided by which the shingle bolt is fed alternately, as to its ends, so as to first cut the butt of a shingle from the front end and then to cut a tip from the same end, all such irregular bolt-feed being automatic and simultaneous with the back or reverse movement of the table.

My invention consists in the several novel features of construction hereinafter described and which are specifically set forth in the claims hereunto annexed. It is constructed as follows, reference being had to the accompanying drawings, in which—

Figure 1, is a front elevation of the machine, the saw being dotted in. Fig. 2, is an elevation in plan view of the carriage feed mechanism upon the rear of the machine. Fig. 3, is a side elevation of the machine. Fig. 4, is an enlarged detail of the mechanism for setting the bolt feed. Fig. 5, is an enlarged detail of the friction clutch part of the bolt-feed mechanism. Fig. 6, is a front elevation of the eccentric mechanism by which the taper of the cut of the shingles is regulated. Fig. 7, is a top plan of the drive pulley and mechanism for stopping and starting the carriage, the clutch bars being shown in dotted lines. Fig. 8, is a vertical sectional elevation of the drive pulley, its shaft, the clutch bars, and the cone-brake mechanism. Fig. 9, is a side elevation of the pulley, and the clutch bars, the shaft being shown in transverse section. Fig. 10, is a plan view of one of the elbow levers part of the bolt-feed mechanism. Fig. 11, is an enlarged detail of the clutch shown in Fig. 5, showing some slight differences in construction. Fig. 12, is a vertical sectional elevation of the clutch mechanism of Figs. 5 and 11. Fig. 13, is a vertical sectional elevation of the bolt-feed mechanism shown in Fig. 4. Fig. 14, shows a front plan of the face of the hub —6—, the bolt-feed mechanism Fig. 13. Fig. 15, is a plan perspective of the eccentric. Fig. 16, is a plan perspective of the shifting bar shown in Figs. 4 and 13. Fig. 17, is a plan view of the arm which carries the feed shifting pawl which is operated upon by the arms of the shifting bar, shown in Figs. 4, 13 and 16. Fig. 18, is a front elevation of the same. Fig. 19, is a sectional elevation of the shaft which carries the bolt-feed eccentric, and the spring which holds it in the three positions necessary, for the two tapers, and the straight-cut. Fig. 20, is a plan of the tappet upon the traversing table, and the stop rod with which it engages to stop the carriage in its forward motion, when it is desired to use it. Fig. 21, is an enlarged side elevation of the standard and brackets carrying the feed dogs.

A, is the bed of the machine suitably supported by legs, and provided on its upper face with parallel ways —a— projecting upward, and —a'— is the traversing carriage provided with grooved blocks —a"— fitting upon said ways. This table is driven by the following mechanism: In suitable uprights —b— erected on opposite sides of the bed, the main shaft —b'— is suitably journaled, and —b"— is the main drive pulley secured thereon, and —c— is a balance wheel, —c'— is the carriage driving pulley, also secured on said shaft; while on its opposite end the saw —c"— is mounted. Upon the shaft —d— fixed in the bed, the cone pulley —d'— is loosely mounted, and —d"— is a sleeve loose upon said shaft. Sockets —e— are hinged on opposite sides of this collar each being provided with an ear —e'—. A slide (not shown) is mounted in each socket, and —e"— is a wooden arm secured thereto, each slide being provided with an ear —e'"— in which a set screw is mounted as shown, bearing against the ear —e'— so that thereby the projection of each arm is adjusted. The inside of the rim of the pulley —d'— is provided with a concave groove, and when the sleeve is moved toward the hub of the pulley, said arms are projected into said groove, and by their frictional engagement therewith, the sleeve is rotated, the area of such frictional contact being enlarged according to the area of the groove, the arms filling the same. This clutch is operated by means of a yoke —h— connected to said sleeve, and having its body pivoted to a bracket upon the bed; a lever —h'— pivotally connected to said body and having a lug —h''— engaging with the curved cam groove —h'''— in the stationary bar, shown, which is rigidly secured to the bed; a connecting rod —k— connected at one end to the lever —h'—, and at the other end to the inner end of the hand lever —k'— pivoted in a slot in the edge of the bed, all so when said hand lever is shifted in one direction the clutch is thrown into engagement, and when shifted the other way it is thrown out of its engagement with said pulley. The pinion —m— is secured upon said shaft, having one end beveled outwardly, as shown and the other secured to said sleeve, and —m'— is a collar rigidly secured upon said shaft and having one end beveled inwardly, so that when the sleeve pinion is operated to open the clutch, the beveled faces of the pinion and collar by their frictional engagement operate together as a brake to stop the rotation of the pinion. A gear —n— engages with said pinion, and is journaled upon a suitable arbor secured to the bed.

An arm —n'— (Figs. 2 and 3) is secured to the bed, and one end of the link —n''— is pivoted upon a bolt inserted through it and into said arm; said link being adjustable by shifting said bolt from one bolt-hole in the link to another.

The bolt in the top hole, with the belt on slow speed of the cone will move the table backward as fast as the fast belt speed will with the bolt in the bottom hole of the link.

Upon a spoke of the wheel, a roller —p— is connected adjustably by means of a bolt inserted through it and the slot shown in the spoke, said roller being within the link, and the free end of said link, one end of the connecting rod —r— is connected, its other end being connected to the arm —r'— which is secured to the side of the traversing table.

Upon the table, the shingle bolt-holding frame is erected, consisting of the uprights —s— and the cross bar —s'—, and —s''— are arms projecting toward the front of the machine from said uprights, and mounted in guideways therein. In these arms the rotating dogs —t— are journaled each consisting of a shaft and a cylinder, which carries a series of dogs —t'— between which the bolt is gripped, and by which it is supported, said dogs being reversed as shown. Upon each dog shaft, a shifter is secured, by which it is rotated to feed the bolt to the saw, consisting of a friction ring —u— secured onto said shaft, a lever —u'— provided with pawls —u''— between which said ring fits and with which they engage frictionally, a friction spring —u'''— bearing upon said shaft and engaging with said lever; said pawls being shown as pivotally mounted in Fig. 5 and as rigid upon the lever in Fig. 11. A connecting rod —v— is connected at one end to each side of said shifting levers, and at the other end is pivotally and adjustably connected to each of the auxiliary levers —v'— which are pivotally mounted upon the plate —v''— adjustably mounted upon the side of one of the uprights of the bolt frame, each of which is provided with an arm —v'''— having an enlarged head, or anti-friction roller —w— upon the end. These auxiliary levers are mounted in reversed positions, and each is provided with a lip —w'— which engages with a set-screw —w''— mounted in a lug upon said plate —v''—.

Uprights —x— are erected upon the bed, and —x'— is a cross bar connecting their tops. Upon this cross bar a hanger plate —y— is mounted provided with a horizontal arbor —y'— (Fig. 6) upon which an eccentric —y''— is secured and —y'''— is a plate perforated so as to be mounted upon said eccentric (see dotted lines Fig. 4); and —z— is an oscillating lever secured to said eccentric, and adapted by its oscillation and consequent partial rotation of the eccentric to raise or lower the plate; said plate being wedge-shaped, having the inclined or converging edges, as shown; and said lever —z— having projecting studs upon which the anti-friction rollers —z'— are journaled.

The eccentric —y''— is secured to the arbor —y'— by means of a bolt —1— inserted through the slot —2— in the eccentric (Fig. 15) and is adjustable to vary the degree of its eccentricity. Said bolt also secures the oscillating lever —z— in position, said lever having a transverse groove —3— which receives the rib —4— on the eccentric while the rib —5— thereon fits into a groove (shown in Figs. 13, 14, 15 and 16) in the hub 6, Fig. 13, which is secured to the arbor, so that this arbor and hub are rotated by the rotation of the eccentric; and this rotation also raises or lowers the wedge plate.

Upon the uprights of the bolt-frame a bracket —7— is mounted, concaved in its outer end, and therein a pawl —8— is pivoted upon the thumb-screw —9—. Then when the bolt carriage is brought back by its reversal, this pawl upon the bracket —7— engages with one of the frictional rollers —z'— and rotates the lever —z— and the eccentric and raises the wedge plate; next the friction rollers on the auxiliary levers —v'— encounter the inclined faces of the eccentric —y'''. When this plate is raised, the upper lever —v'— will first engage with it, and later on the lower one will engage with it. This engagement swings each lever and rotates the upper and lower bolt-dogs in unequal degree, thus giving an inclination to the block for cutting the taper of the shingle, with the tapered end at the top. Then when the carriage again reverses and comes back, the eccentric will be rotated in the opposite direction and the shingle will be cut with the butt at the top and the tapered end at the bottom.

By tightening the thumb-nut or screw the pawl will be held up where it will not engage with the rollers on the oscillating lever, leaving it to cut the butts all at one end; or when boards are wanted with both ends the same thickness, with the arbor and eccentric turned one-quarter over, the center flat portion engaging with the spring loop. The loop-spring —10— (dotted lines Fig. 4) has one end secured to the hanger and the other end engages with one of the grooves —11— cut in the arbor —$y'$—, there being three of them, two on opposite sides, and one between them, and when this arbor is rotated by the oscillation of the lever —$z$—, the engagement of the spring is shifted from one lateral groove to the other opposite one, and thus said spring operates to hold the arbor, eccentric and lever in the positions to which they are shifted. In this manner the bolt is fed so that the shingle butts are cut alternately upon the ends of the bolt.

In case it is desired to cut strips of uniform thickness from the bolt, the lever —$z$— is set in the opposite angle, (see Figs. 1 and 4,) with the spring —10— in engagement with the central groove in said arbor, and this will set the wedge plate in such position that both shifting levers will simultaneously engage with its inclined edges and thus rotate both bolt-dogs equally and feed the bolt alike top and bottom.

By shifting the eccentric so as to vary the throw of the wedge-plate, the taper of the shingle is varied; and by varying the point of the connection of the connecting rod to the auxiliary levers, the feed of the bolt-dogs is varied, and consequently the thickness of the shingle butts is varied, being made thicker as the connection is changed away from the pivot of the lever, and reduced by changing the point of connection toward the pivot, the one increasing the throw of said rod and the rotation of the bolt-dog, and the other decreasing them.

The traversing table is operated upon changeable or different speeds, as with a slow forward movement, toward the saw, and with a very quick return, all without the reversing of the motion of the drive pulleys or of the drive pinion or gear. When the main gear is rotated, such rotation causes the roller within the link to traverse the link from one end to the other. As shown in Fig. 2 the table is shown as partly moved toward the right, in that figure, or to the left in Fig. 1, and as the gear rotates over to the right, in Fig. 2, the roller travels toward the pivot of the link, until when it has reached the other end of the link opening, the table stops its backward movement, such movement having started slow and gradually increasing in speed on account of the continuous reduction of the distance between the roller and the link pivot, which increases the throw of the top of the link in proportion as its length beyond the roller, increases; and then when the roller again starts to travel away from the link pivot, the motion of the table is reversed and it is fed forward toward the saw with a movement gradually decreasing in speed as the roller increases its distance from the link pivot. From this it will be seen that the forward feed of the carriage gradually reduces in speed as the saw cuts farther and farther into the bolt, then automatically stops, then automatically reverses to the back feed, starting slow and increasing in speed until it reaches the limit, then automatically reverses for the forward feed, and so on so long as the clutch remains in engagement with the rim of the cone pulley, and by shifting the hand lever the clutch is released, the cone pulley runs free, and the brake is applied, to the sleeve which carries the pinion and clutch, and the table is stopped quickly.

The bolt frame is provided with grooved brackets —12— which fit onto the way —13— upon the cross bar —$x'$— and traversing it with the movements of the table, operate to steady the bolt-frame and maintain it vertically.

In a bracket —14— below the cross-bar —$x'$— a bar —15— is secured, its other end engaging with the wedge plate in such manner (not shown) as to prevent the rotation of the eccentric from tilting said plate out of a direct vertical line.

The machine is provided with a suitable table to receive the shingles, as they are cut.

The inner faces of the uprights of the bolt-frame are grooved vertically and in these grooves the coiled springs —16— are placed in such manner as to yieldingly hold the top dogs down upon the bolt.

The bite of the bolt-dogs into the bolt is produced and regulated by means of these springs to which the lever —18— pivoted at —19— on the top of the bolt frame is connected, said bar being connected to the bar —20—, connecting the arms which carry the upper bolt-dogs, so that by depressing it the upper bolt-dogs are raised for the introduction of a fresh bolt.

In Fig. 20 I show the traversing table provided with a tappet —21— adapted to engage with a lip —22— upon the rod —23—, which may be connected to the rod —$k$— to release the clutch, or it may be connected to an ordinary belt-shifting mechanism (not shown) by which the table can be reversed the same substantially, as in a metal planing machine.

What I claim as my invention, and desire to secure by Letters Patent, is—

1. In a shingle machine, a bed frame, a hanger erected thereon, an arbor journaled therein, an eccentric upon said arbor, a wedging plate with which said eccentric engages, and means to rotate said eccentric to automatically raise and lower said plate, in combination with the bolt-feed dogs, and intermediate connections actuated by said plate to rotate said dogs, and the traversing bolt carrying table, carrying said dogs, and the saw erected upon said frame.

2. In a shingle machine a bed frame, a hanger erected thereon, an arbor journaled therein, an eccentric upon said arbor and means to adjust it to vary its throw a wedge with which said eccentric engages, and means to rotate said eccentric to automatically raise and lower said plate, in combination with the bolt-feed dogs and intermediate connections actuated by said plate to rotate said dogs, and the traversing bolt carrying table carrying said dogs, and the saw erected upon said frame.

3. In a shingle machine, a bed frame, a hanger erected therein, an eccentric adjustably connected to said arbor, a wedging plate with which said eccentric engages a spring engaging with said arbor, and means to rotate said eccentric to automatically raise and lower said plate, in combination with the bolt-feed dogs and intermediate connections actuated by said plate to rotate said dogs, and the traversing bolt carrying table, carrying said dogs, and the saw erected upon said frame.

4. In a shingle machine, a bed frame, a hanger erected thereon, an arbor journaled therein, an eccentric adjustably connected to said arbor, a wedge with which the eccentric engages, a spring engaging with said arbor, an oscillating lever connected to said eccentric, and means to rotate said eccentric to automatically raise and lower said plate, in combination with the bolt-feed dogs and intermediate connections actuated by said plate to rotate said dogs, and the traversing bolt carrying table carrying said dogs, and the saw erected upon said frame.

5. In a shingle machine, a bed frame, a hanger erected thereon, an arbor journaled therein, an eccentric adjustably connected to said arbor, a vertically reciprocating wedge with which said eccentric engages, an oscillating lever connected to said eccentric, and means to rotate said eccentric to raise and lower said wedge in combination with auxiliary levers adapted to engage with said oscillating lever, the bolt feed dogs secured upon shafts, levers upon said shafts connected to said auxiliary levers, the traversing bolt-carrying table, carrying said dogs, and the saw erected upon said frame.

6. In a shingle machine an oscillating eccentric, a wedge plate vertically reciprocated by it, a traversing table, feed dogs carried thereby, and auxiliary levers operatively connected to them and intermittently engaging with said wedge to rotate said dogs, in combination with the bed frame, and the saw erected thereon.

In witness whereof I have hereunto set my hand this 25th day of January, 1893.

A BERTSELL IRELAND.

In presence of—
J. E. JULIAND,
W. J. RUSSELL.